United States Patent [19]

White, Jr.

[11] Patent Number: 4,537,137
[45] Date of Patent: Aug. 27, 1985

[54] COMBINATION RAILCAR MOVING VEHICLE AND TRAILER SPOTTER

[75] Inventor: Eugene B. White, Jr., Park Forest, Ill.

[73] Assignee: White Machinery Corporation, Joliet, Ill.

[21] Appl. No.: 353,842

[22] Filed: Mar. 1, 1982

[51] Int. Cl.³ .............................................. B61C 11/00
[52] U.S. Cl. ............................... 105/26 R; 105/90 A; 105/215 C
[58] Field of Search ...................... 105/26 R, 26.1, 73, 105/75, 90 A, 215 C

[56] References Cited

U.S. PATENT DOCUMENTS

| | | | |
|---|---|---|---|
| 1,938,049 | 12/1933 | Serrano | 105/215 C |
| 2,018,972 | 10/1935 | Pollock et al. | 105/215 C |
| 2,039,489 | 5/1936 | Messick | 105/215 C |
| 2,088,522 | 7/1937 | Klima | 105/215 C |
| 2,157,651 | 5/1939 | Fildes | 105/215 C |
| 3,263,628 | 8/1966 | Grove et al. | 105/215 C |
| 3,898,938 | 8/1975 | Poole | 105/215 C |
| 3,940,167 | 2/1976 | Pilz | 105/26 R X |
| 4,266,483 | 5/1981 | Rannanmaki | 105/26.1 X |
| 4,355,584 | 10/1982 | White, Jr. | 105/215 C |

*Primary Examiner*—Robert B. Reeves
*Assistant Examiner*—Dennis C. Rodgers
*Attorney, Agent, or Firm*—Charles F. Pigott, Jr.

[57] ABSTRACT

A combination railcar moving vehicle utilizing the weight transfer principle and trailer spotter which has a plurality of steel rail wheels for moving a railcar along rail, and has a plurality of road wheels for spotting a highway trailer in a switching yard, the combination vehicle including four rail wheels, two of which are driven, and four road wheels, two of which are driven, so as to provide 2-wheel rail drive and 2-wheel road drive, and further having oscillating means for permitting the remaining free-wheeling road and rail wheels to oscillate up and down to accommodate uneven rail or ground conditions. When the machine is operating on rail it is working inside the AAR clearance patterns stipulated by the American Association of Railroads.

14 Claims, 6 Drawing Figures

COMBINATION RAILCAR MOVING VEHICLE AND TRAILER SPOTTER

BRIEF SUMMARY OF THE INVENTION

It is known in the art to provide railcar moving vehicles which drive on rail for moving railcars along track in a rail yard. It is also known to provide a trailer spotter vehicle which drives on road wheels and is designed to move highway trailers around a switching yard. Since many users have the need for moving railcars in a rail yard and also for moving trailers about a switching yard, an advantage is afforded if a suitable vehicle can be provided which performs the two functions of moving a railcar on rail and spotting a trailer on ground.

Prior attempts have been made to provide a combination railcar moving vehicle and trailer spotter, but such combination vehicles have not been successful in achieving the performance of separate vehicles designed specifically as railcar moving vehicles or as trailer spotters.

One known combination vehicle includes four road wheels all of which are drive, and four to eight rail wheels which are mounted at each end of the vehicle and none of which are driven. In such a vehicle, the non-driven steel rail wheels are raised during road travel, and for rail travel they are lowered to the rail where they take a small portion of the weight of the vehicle and serve to guide the vehicle on the rail while it is driven by the four road wheels.

The primary purpose for utilizing four driven road wheels in the above combination vehicle is because road wheels do not function well on rail in wet weather, and it is thus generally necessary to provide 4-wheel drive where road wheels are used on rail. However, 4-wheel drive suffers a serious disadvantage on road, because at one end of the vehicle where a trailer is supported on the vehicle's fifth wheel plate, the two road wheels are under very heavy load, whereas at the other end of the vehicle the two road wheels are under a relatively light load. Since road wheels are compressible in accordance with the amount of load, the lightly loaded road wheels are at a significantly larger diameter and thus tend to drive at a higher speed.

The foregoing phenomenon, which occurs where a 4-wheel drive vehicle operating on road is substantially more heavily loaded at one end, tends to cause shaft wind-up problems known in the art as "spin-out". Accordingly, where road wheels are used both on rail and on road, 4-wheel drive may be necessary on rails especially in wet weather, but 4-wheel drive is a disadvantage when the vehicle is used on ground for spotting highway trailers in a freight yard.

Still another disadvantage of a vehicle of the foregoing type is that the non-driven steel rail wheels or guide wheels must take a portion of the vehicle weight in order to assure that the guide wheels are properly engaged with the rail. However, any such weight assumed by the steel guide wheels which are not driven results in a lowering of the load carried by the driven road wheels, thereby reducing the traction of the drive wheels.

Another disadvantage in the use of road wheels for driving on rail is that only a very limited amount if any of the weight of a railcar can be transferred to the railcar moving vehicle due to the compressibility and limited strength of the road wheels as compared to steel rail wheels. It is known to provide for such weight transfer, and a substantial advantage is afforded thereby due to the increased traction afforded to the drive wheels, provided the drive wheels are steel and can support the increased load.

Another known combination vehicle provides four road wheels, two of which are driven, and one pair of steel guide wheels at each end of the vehicle, none of which are driven. As in the first-mentioned combination vehicle described above, the four steel wheels are lowered when driving on rail so that while they are not driven they serve to support a portion of the weight of the vehicle and guide the vehicle along the rail.

When the foregoing combination vehicle is operated on rail, a portion of the weight of the railcar is transferred to the end of the vehicle at which the two driven road wheels are located for the purpose of increasing traction. However, as mentioned above, road wheels do not function well on rail, especially in wet weather. In addition, only a limited amount of the weight of a railcar can be transferred to a railcar moving vehicle which utilizes road wheels on rail, due to the compressibility and limited strength of road wheels as compared to steel rail wheels. Moreover, where a vehicle of the foregoing type utilizes steel guide wheels at both ends of the vehicle, the substantial spacing between the guide wheels will impair operation of the vehicle in traversing curves on rail.

The above-mentioned problem of operating road wheels on rail during wet weather does not occur where rail wheels are driven on rail. Steel wheels are much less affected by wet weather as compared with road wheels used on rail. Also, in wet weather it is possible to spread sand on the rail which will be crushed by steel wheels and provide substantial traction. Rubber road wheels will not crush the sand and thus cannot be aided in wet weather as can steel rail wheels. There are additional disadvantages in using road wheels for driving on rail because such wheels will tend to wear only at the center of the tire and also they tend to be damaged by crossover plates of the type normally used for guiding steel rail wheels where tracks cross one another.

It will be understood that combination vehicles of the type discussed above normally include a fifth wheel plate for supporting one end of a highway trailer when used on ground for spotting a highway trailer in a switching yard, and a coupler for coupling to the end of a railcar when operating on rail to move a railcar in a rail yard. The fifth wheel plate is normally movable vertically so it can be positioned under the forward end of a highway trailer and then raised so as to support the trailer (see FIG. 4). In addition, the coupler may be vertically movable if it is designed to transfer a portion of the railcar weight to the railcar moving vehicle for traction purposes as discussed above (see FIG. 5).

It is a general object of the present invention to provide a combination railcar moving vehicle and highway trailer spotter which provides optimum performance both on rail and when spotting a trailer in a switching yard.

A further object of my invention is to provide a combination vehicle as last above-mentioned which provides 2-wheel drive with all steel wheels on rail, and 2-wheel drive with all rubber wheels on road.

Another object of the invention is to provide a combination railcar moving vehicle and highway trailer spotter which provides four steel wheels for operation on rail, two of which are driven, and four rubber wheels for operation on road, two of which are driven and which provides for substantial transfer of the weight of a railcar to the combination vehicle when operating on rail to afford optimum driving traction on rail.

An additional one of my objects is to provide a pair of pivot arm members, each of which carries one free-wheeling rail wheel and one free-wheeling road wheel, and two pivot arm members being pivotally movable between first positions where the two free-wheeling rail wheels are in lowered operative positions with the road wheels raised, and second positions where the two free-wheeling road wheels are in lowered operative positions with the rail wheels raised.

Still another of my objects is to provide a combination vehicle as last above-mentioned where the two pivot arm members are mounted on a common axle member which is capable of oscillating movement about a central longitudinal pivot axis so that the free-wheeling road and rail wheels when in lowered operative position are capable of generally vertical movement as necessary to accommodate uneven rail or road conditions.

The foregoing and other objects and advantages of the invention will be apparent from the following description of a preferred embodiment, taken in conjunction with the accompanying drawings.

Now, in order to acquaint those skilled in the art with the manner of making and using my invention, I shall describe, in conjunction with the accompanying drawings, a preferred embodiment of the invention.

DETAILED DESCRIPTION OF THE INVENTION

In the following description and in the appended claims, it will be understood that where two road tires are mounted side-by-side on the same axle, they will be considered the equivalent of a single wheel. Such use of double tires to support additional load does not affect the principles of the present invention. Thus, the term "2-wheel drive" shall be deemed applicable where only a single axle is driven, even though four rather than two road tires may be mounted on the driven axle.

Figure 1:
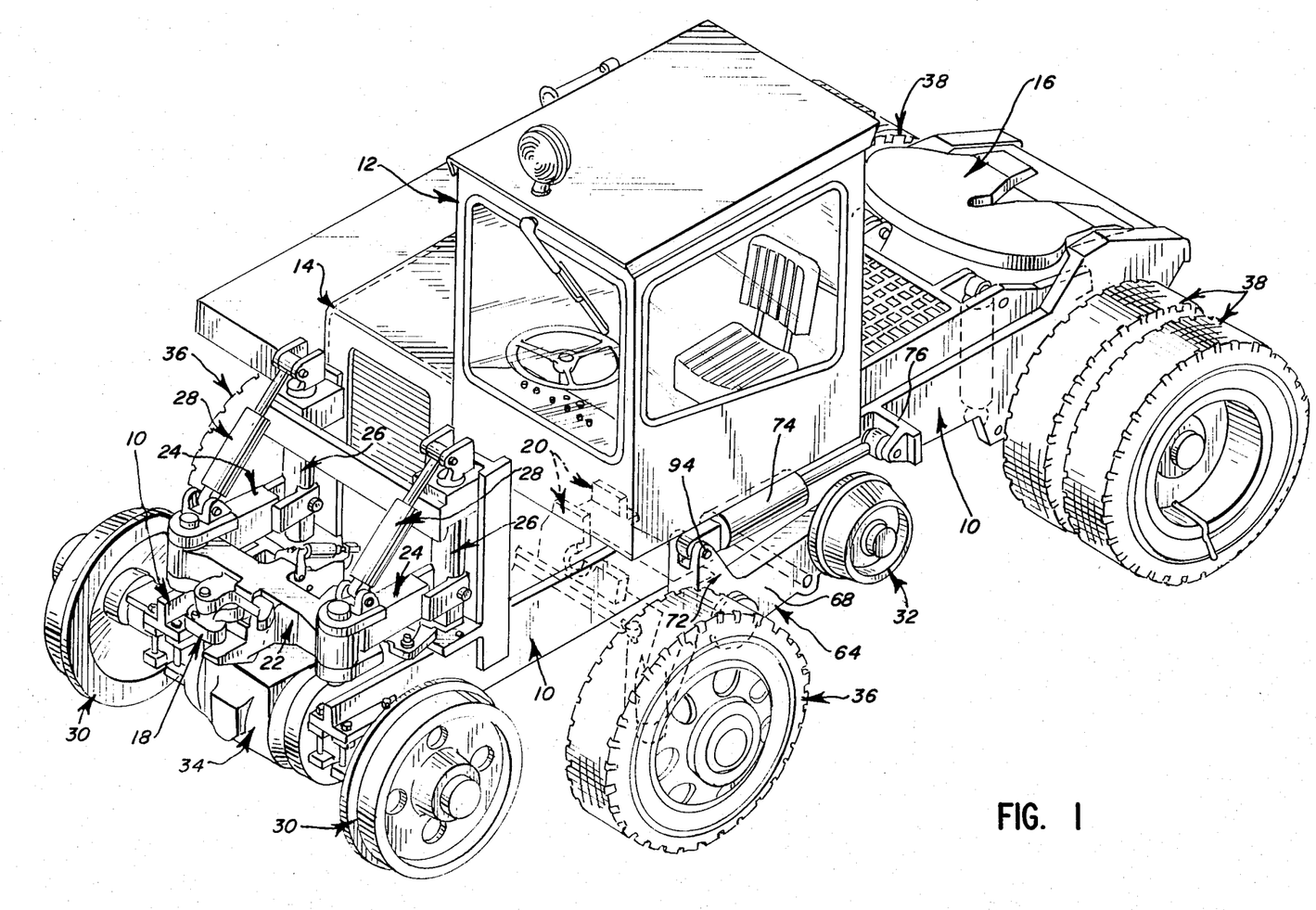
FIG. 1 is a perspective view of a combination railcar moving vehicle and highway trailer spotter constructed in accordance with the present invention.

Referring now to the drawings, FIG. 1 shows a combination railcar moving vehicle and highway trailer spotter comprising a main frame 10, cab 12, radiator compartment 14, elevating fifth wheel plate 16 for hydraulically supporting and raising one end of a highway trailer to be spotted, and a coupler 18 for coupling with a trailer to be pushed or pulled along rail in a rail yard. The main frame comprises a pair of side frame members as shown at 10 which are parallel to one another and extend substantially the full length of the combination vehicle as shown in FIG. 1, and various main frame cross members 20 which interconnect the side frame members 10.

The coupler 18 is associated with a cross member 22, two horizontal members 24, two vertical members 26, and a pair of inclined hydraulic cylinders 28. It is sufficient for purposes of understanding the present invention to recognize that the coupler 18 is vertically movable by the cylinders 28 so that it may be positioned beneath the coupler of a railcar and then raised so as to transfer to the combination vehicle a predetermined portion of the weight of the railcar and thereby increase traction in driving the combination vehicle on rail. In addition, the coupler 18 is capable of lateral movement from side-to-side in order to permit the combination vehicle to traverse curves as it moves along track.

The combination vehicle shown in FIG. 1 further includes a pair of front flanged rail wheels 30 and a pair of rear flanged rail wheels 32 for travelling on a pair of rails of a railroad track. As will be described more fully hereinafter, the front rail wheels 30 are mounted on a fixed axle 34 and are driven, while the rear rail wheels 32 are free-wheeling and are pivotally movable between lowered operative positions and raised inoperative positions. The vehicle is further equipped with a pair of front road wheels 36 and a pair of rear road wheels 38 for traveling on other road or ground surfaces.

As will be more fully described later herein, the front road wheels 36 are free-wheeling and steerable, and the rear road wheels 38 are driven. The front road wheels 36 are pivotally movable between lowered operative positions and raised inoperative positions, while the rear driven road wheels 38 are mounted on a fixed axle. There are shown a pair of road wheels 38 in side-by-side relation at each end of the rear road wheel axle as is common in the art, but the extra two road wheels 38 are merely to provide added support strength and do not affect the operation of the invention. Accordingly, the terms "2-wheel drive" and "pair" of driven road wheels 38 will be understood to encompass the use of four road wheels 38 as shown.

Figure 2:
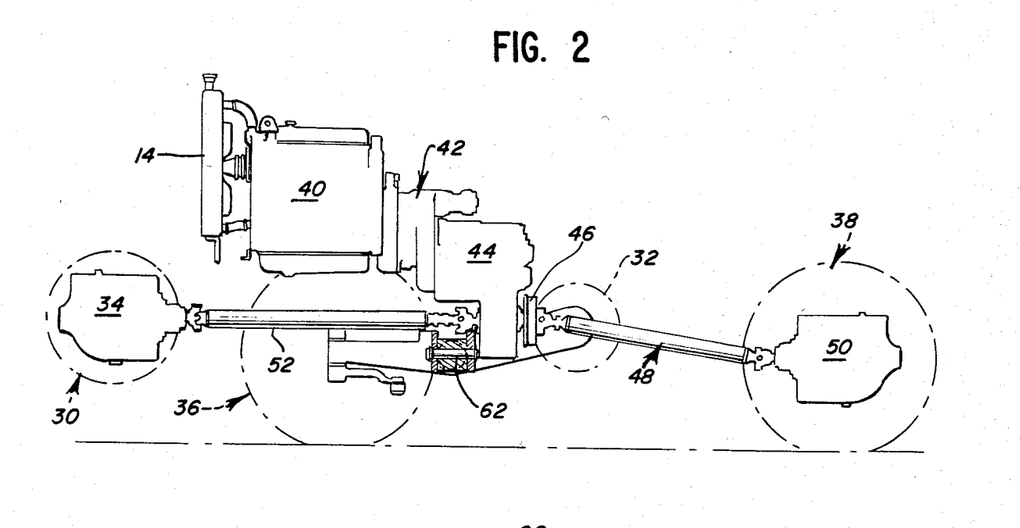
FIG. 2 is a reduced schematic side elevational view of the engine and other drive components for driving a pair of road wheels at the rear of the combination vehicle and a pair of rail wheels at the front end of the vehicle.

Reference is now made to FIG. 2 which shows the components for driving the front rail wheels 30 and rear road wheels 38. There is shown an engine 40, radiator 14, torque converter 42, transmission 44, parking brake 46, rear universal joint drive shaft 48, rear road wheel drive axle 50, front universal joint drive shaft 52, and front rail wheel drive axle 34. Known synchronized disconnect structure may optionally be provided between the transmission 44 and the respective drive shafts 48 and 52 so the drive to shaft 48 is disengaged when the rear road wheels 38 are raised and inoperative, and the drive to shaft 52 may be disengaged when the front rail wheels 30 are raised and inoperative. Such disengagement structure may be provided as a safety factor so wheels raised to an inoperative position are not driven.

Figure 3:
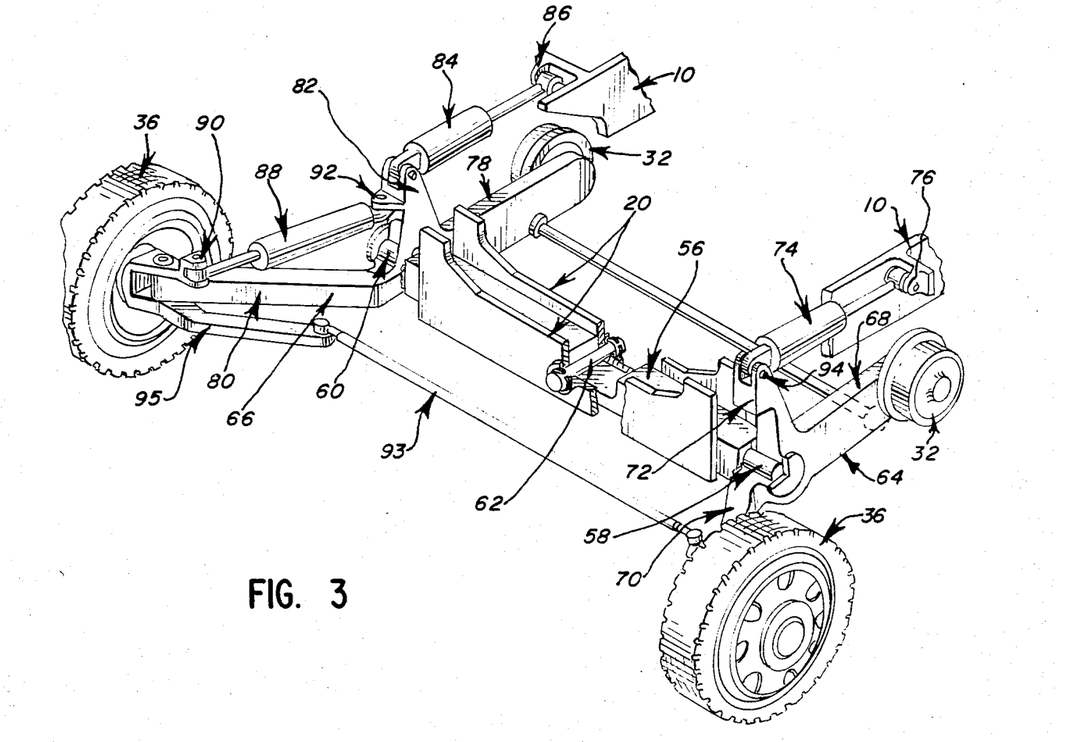
FIG. 3 is a fragmentary perspective view of the middle portion of the combination vehicle of FIG. 1 showing a pair of pivot arms each of which carries one steerable free-wheeling road wheel and one free-wheeling rail wheel, whereby when the pivot arms are moved to one position the two road wheels are lowered into operative positions with the rail wheels raised, and when the pivot arms are moved to a second position the two rail wheels are lowered into operative positions with the road wheels raised.

FIG. 3 illustrates the manner of mounting the free-wheeling road wheels 36 and rail wheels 32 so they may be moved between operative and inoperative positions. FIG. 3 shows the two parallel main side frame members 10, and the main frame cross members 20 which interconnect the side frames. An axle 56 has pivot shafts 58 and 60 at its opposite ends. The axle 56 is of rectangular cross-section and is mounted between the main frame cross members 20 on a longitudinal axle center pivot shaft 62. The axle center pivot 62 is journalled in the two parallel main frame cross members 20, and the axle 56 is capable of pivotal movement about the center pivot 62 so as to permit one of the end pivots 58 and 60 to move upwardly while the other moves downwardly for a purpose to be described hereinbelow.

A first axle pivot arm 64 is mounted on the pivot shaft 58, and a second axle pivot arm 66 is mounted on the pivot shaft 60. the axle pivot arm 64 includes a first arm 68 on which the free-wheeling rail wheel 32 is mounted, a second arm 70 on which the free-wheeling road wheel 36 is mounted, and a third arm 72 which is connected to one end of a hydraulic cylinder 74, the other end of the cylinder being connected to the main side frame member 10 at lug 76. In a similar manner, the axle pivot arm 66 includes a first arm 78 on which the free-wheeling rail wheel 32 is mounted, a second arm 80 on which the free-wheeling road wheel 36 is mounted, and a third arm 82 which is connected to one end of a hydraulic cylinder 84, the other end of the cylinder being connected to the main side frame member 10 at lug 86.

Conventional means (not shown) are utilized for actuating the two hydraulic cylinders 74 and 84 simultaneously for the purpose of raising and lowering the free-wheeling wheels 32 and 36. Thus, when it is desired to operate on ground for purposes of spotting highway trailers in a freight yard, the two cylinders 74 and 84 are fully extended to the position shown in FIG. 4 where the free-wheeling road wheels 36 are lowered to operative positions and the rail wheels 32 are raised with the result that all four rail wheels 30 and 32 are elevated above the ground level as clearly shown in FIG. 4.

Moreover, as shown in FIG. 3, the free-wheeling road wheels 36 are steerable by means of a hydraulic steer cylinder 88 which has one end connected to a lug 90 associated with the adjacent road wheel 36 for steering the same, and its other end is connected to a lug 92 formed on arm 82 of pivot arm 66. A tie rod 93 connects with lever 95 associated with the foregoing wheel 36 and connects in a similar manner to the opposite wheel 36 for steering the latter.

Figure 4:
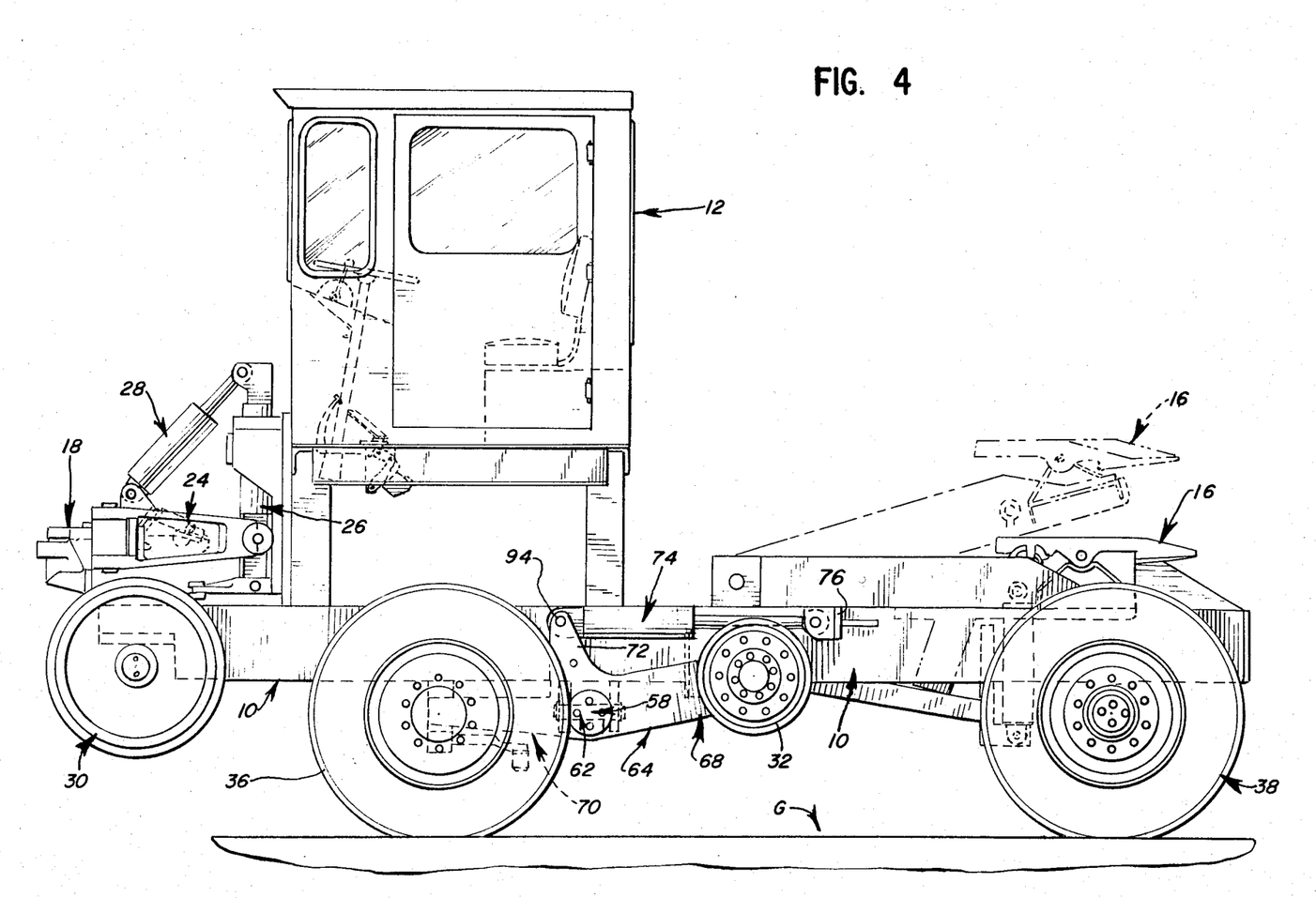
FIG. 4 is a side elevational view of the combination vehicle of FIG. 1 showing the four road wheels engaged on the ground and the four rail wheels raised as when the vehicle is utilized to spot highway trailers in a switch yard.

It will further be noted from FIG. 4 that in the foregoing condition for driving on road, the main side frame members 10 are approximately parallel to ground level as indicated at G, and the hydraulic cylinder 74 is approximately parallel to the side frame members 10 and to ground G. It will also be seen from FIG. 4 that pin 94 which connects the forward end of cylinder 74 to lug 72 is located somewhat forwardly of pivot 58, i.e., forward of center. In addition, since frame 10 is horizontal or parallel to ground, the axle center pivot 62 is also parallel to ground and to the hydraulic cylinder 74.

Figure 5:
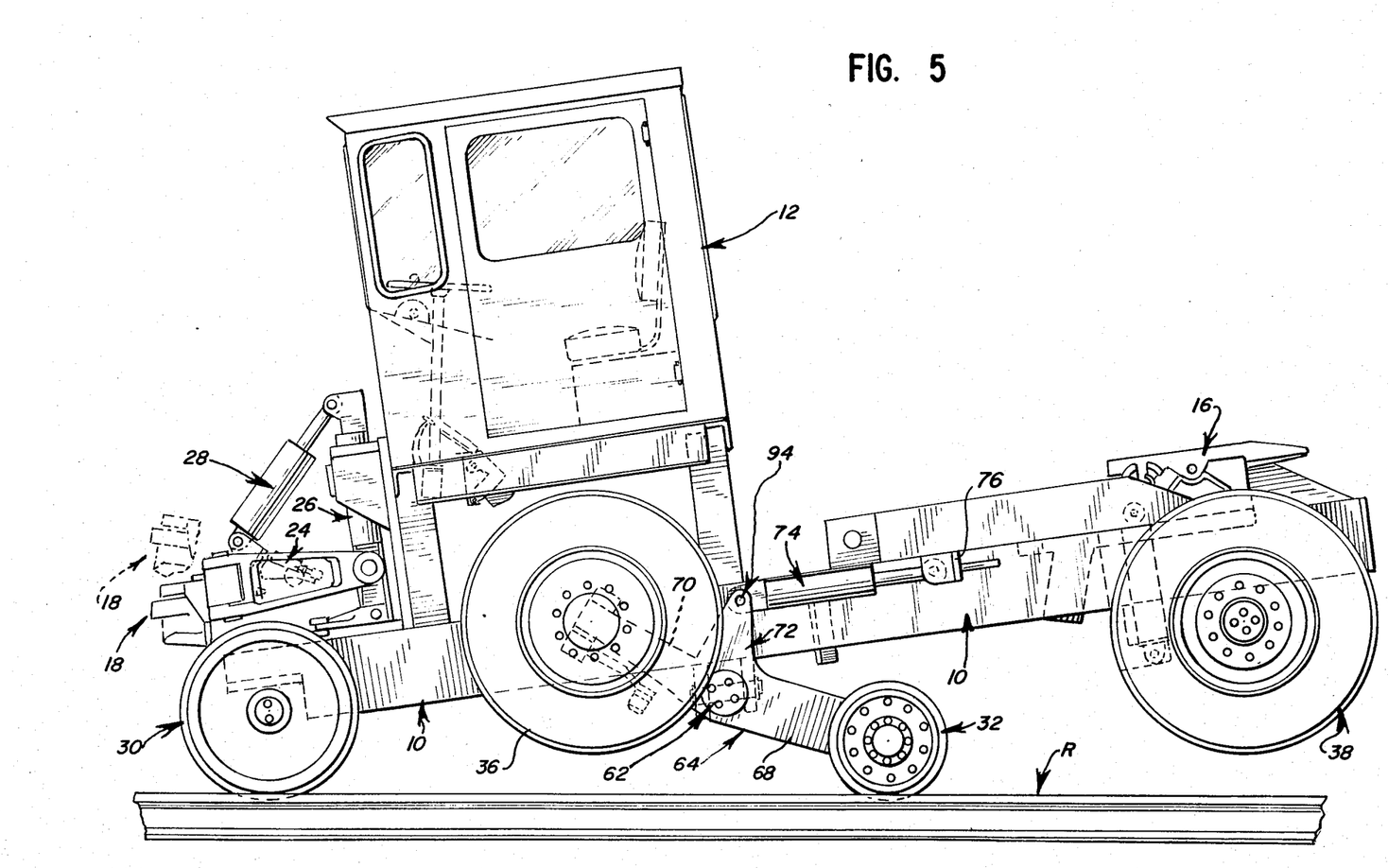
FIG. 5 is a side elevational view of the combination vehicle of FIG. 1 showing the four rail wheels engaged on track and the four road wheels raised as when the vehicle is utilized to move railcars along track in a rail yard.

When it is desired to operate on rail, the hydraulic cylinders 74 and 84 are retracted to the position shown in FIG. 5 causing the free-wheeling road wheels 36 to be raised and the free-wheeling rail wheels 32 to be lowered to the rail R. The lowering of the rail wheels 32 to the rail causes frame member 10 to assume an inclined position relative to the rail as shown in FIG. 5. In the foregoing position, all four of the road wheels 36 and 38 are raised well above the rail. It is further important to note that the retracted cylinder 74 remains parallel to the main side frame members 10 in the position of FIG. 5, and thus parallel to the axle center pivot 62.

Accordingly, the cylinders 74 and 84 remain parallel to the axle center pivot 62 in both their extended and retracted positions, which is important for purposes of oscillation of the free-wheeling wheels as will be explained hereinbelow. It will be understood that it is possible to maintain cylinders 74 and 84 parallel to the frame 10 and axle center pivot 62 in both extended and retracted positions because in the one position the forward end of the cylinders (see pin 94 in FIG. 3) is somewhat forward of center or of the pivot 58 and in the other position it is an equal amount rearwardly of center or of pivot 58.

Referring again to FIGS. 3 and 6, it is an important feature of the present invention that the two pivot arms 64 and 66 are pivotally carried on opposite ends of the axle 56 which itself is capable of pivoting movement about the axle center pivot 62. The ends of the axle 56 are thus capable of moving up and down about pivot 62, and thus the same is true of the pivot arms 64 and 66. It will thus be understood that in the road condition shown in FIGS. 4 and 6 with the cylinders 74 and 84 locked in their extended positions, the two road wheels 36 are capable of oscillating respectively up and down as necessary to accommodate uneven ground conditions. In a similar manner, in the rail condition shown in FIG. 5, with the two cylinders 74 and 84 locked in their retracted position, the two rail wheels 32 are capable of oscillating respectively up and down as necessary to accommodate uneven rail conditions.

It will now be understood why it is desirable to provide a design where the cylinders 74 and 84 remain parallel to the axle center pivot 62 in both their extended positions for driving on ground and in their retracted positions for driving on rail. As long as cylinders 74 and 84 are parallel to axle center pivot 62, there will be little resistance to oscillation of the free-wheeling road and rail wheels 36 and 38 about the center pivot 62. On the other hand, if the cylinders 74 and 84 were permitted to assume positions substantially out of parallel with axle center pivot 62, there would be interference with the desired oscillation of wheels 36 and 32 as described above.

Figure 6:
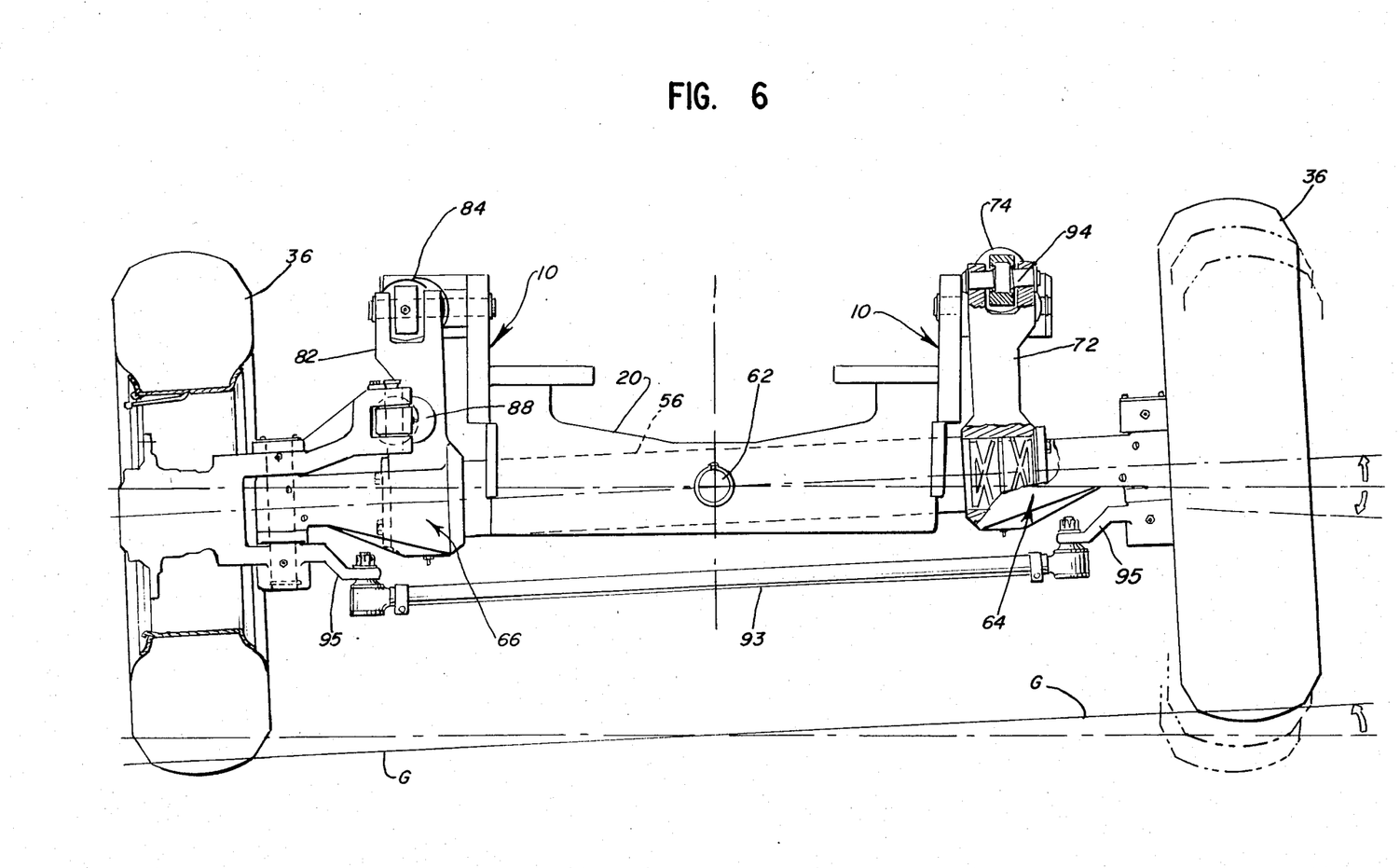
FIG. 6 is an enlarged fragmentary front elevational view showing the manner in which the pair of free-wheeling road wheels may oscillate up and down to accommodate uneven ground.

Of course, as such oscillation actually takes place, the right-hand wheel shown in FIG. 6 if caused to move up will cause a similar downward movement of the opposite wheel 36. Thus, during oscillation the forward ends of the cylinders 74 and 84 will oscillate up and down slightly together with the associated wheels 36. However, oscillation as described above can be obtained as long as the cylinders 74 amd 84 remain substantially parallel to axle center pivot 62 when the vehicle is supported on even ground or rail.

FIG. 6 illustrates the manner of such oscillation, and for purposes of illustration it will be seen that the ground line G is shown elevated above horizontal on the right-hand side and below horizontal on the left. It will be seen how the road wheels 36 are able to follow such uneven ground due to the ability of the axle 56 to pivot about the axle center pivot 62. Such an oscillating mechanism replaces the usual spring suspension system.

It is important to understand that while the preferred embodiment described herein includes the combination of a railcar moving vehicle and a fifth wheel plate for spotting highway trailers, the invention described herein may also be used in other combination vehicles where a railcar moving vehicle is combined with mechanism other than a fifth wheel plate such as a truck body, boom crane, a compressor or other such mechanism which may be mounted in place of the fifth wheel at the option of a customer. In other words, when the machine is in the rubber mode as shown in FIG. 4 it basically comprises a truck chassis which may be equipped for many different operations other than for spotting highway trailers.

In addition to the foregong, the invention described herein may have application in a railcar moving vehicle per se which utilizes rail wheels for operating on rail and rubber road wheels for operating on road, without regard to whether the railcar moving vehicle is combined with other mechanism in the manner described hereinabove.

What is claimed is:

1. In a railcar moving vehicle having a coupler for coupling with a railcar when driving on rail, the improvement comprising, in combination, four steel wheels for supporting the vehicle on rail, four road wheels for supporting the vehicle on the ground, two of said steel wheels and two of said road wheels being movable between operative and inoperative positions, means for actuating said two movable steel wheels into lowered operative positions causing said vehicle to be supported on said four steel wheels with said four road wheels raised and for alternately actuating said two movable road wheels into lowered operative positions causing said vehicle to be supported on said four road wheels with said four steel wheels raised, two of said four steel wheels being driven and the other two steel wheels being free-wheeling, two of said road wheels being driven and the other two of said road wheels being free-wheeling, common drive means for driving the driven steel and road wheels, one free-wheeling steel wheel and one free-wheeling road wheel on one side of said vehicle being mounted on first common pivot arm means, and a second free-wheeling steel wheel and a second free-wheeling road wheel on the other side of said vehicle being mounted on second common pivot arm means, and said means for actuating comprising means for simultaneously pivoting said first and second pivot arm means between a first position where said vehicle is supported on said four steel wheels and a second position where said vehicle is supported on said four road wheels, said first and second pivot arms and the free-wheeling steel and road wheels being positioned between the driven steel wheels and road wheels.

2. In a railcar moving vehicle as defined in claim 1 where said first and seocnd pivot arm means are mounted on opposite ends of a common axle, and said common axle is mounted on a centrally located longitudinal pivot so said opposite ends are capable of oscillating up and down thereby permitting said free-wheeling rail and road wheels to oscillate to accommodate uneven rail and road conditions.

3. In a railcar moving vehicle comprising in combination, a main frame, a vertically movable coupler of the weight transfer type at one end of said main frame for coupling with a railcar when driving on rail, four steel wheels for supporting the vehicle on rail, two of said steel wheels being mounted at said one end of said main frame adjacent said coupler and the second two being spaced therefrom toward the other end of said main frame, four road wheels for supporting said vehicle on the ground, two of said road wheels being mounted at said other end of said main frame, and the second two being spaced therefrom toward said one end of said main frame intermediate the two pairs of steel wheels, said second two rail wheels and said second two road wheels being movable between operative and inoperative positions, and means for actuating said movable rail wheels into lowered operative positions causing said vehicle to be supported on said four steel wheels with said road wheels raised and for alternately actuating said movable road wheels into lowered operative positions causing said vehicle to be supported on said four road wheels with said rail wheels raised.

4. A railcar moving vehicle as defined in claim 3 where said two steel wheels mounted at said one end of said main frame are driven and the second two of said steel wheels are free-wheeling, and where said two of said road wheels mounted at said other end of said main frame are driven and the second two of said road wheels are free-wheeling, and common drive means for driving the driven steel and road wheels.

5. A railcar moving vehicle as defined in claim 4 where one free-wheeling rail and one free-wheeling road wheel on one side of said vehicle are moutned on first common pivot arm means, and a second free-wheeling rail and a second free-wheeling road wheel on the other side of said vehicle are mounted on second common pivot arm means, said means for actuating comprising means for simultaneously pivoting said first and second pivot arm means between a first position where said vehicle is supported on said four steel wheels and a second position where said vehicle is supported on said four road wheels.

6. In a railcar moving vehicle as defined in claim 5 where said first and second pivot arm means are mounted on opposite ends of a common axle, and said common axle is mounted on a centrally located longitudinal pivot so that said opposite ends are capable of oscillating up and down thereby permitting said free-wheeling rail and road wheels to oscillate to accommodate uneven rail and road conditions.

7. In a railcar moving vehicle, the improvement comprising, in combination, four steel wheels for driving on rail, four road wheels for driving on road, two of said steel wheels, one on each side of said vehicle, being movable between lowered operative positions and raised inoperative positions, and two of said road wheels, one on each side of said vehicle, being movable between lowered operative positions and raised inoperative positions, one of said two movable rail wheels and one of said two movable road wheels on one side of said vehicle being mounted on first pivot arm means, and a second of said two movable rail wheels and a second of said two movable road wheels on the other side of said vehicle being mounted on second pivot arm means, said first and second pivot arm means being movable for moving said two steel wheels and said two road wheels between said lowered and raised positions, and said first and second pivot arm means being mounted on common oscillating means, said oscillating means being pivotally movable about a generally longitudinal axis intermediate the two sides of said vehicle.

8. In a railcar moving vehicle as defined in claim 7 where said first and second pivot arm means are mounted on the opposite ends of a common axle, and said common axle is mounted on a centrally located longitudinal pivot so said opposite ends are capable of oscillating up and down thereby permitting said movable steel and road wheels to oscillate to accommodate uneven rail and road conditions.

9. In a railcar moving vehicle as defined in claim 8 where said movable steel and road wheels are freewheeing.

10. In a railcar moving vehicle, the improvement comprising, in combination, four steel wheels for driving on rail, four road wheels for driving on road, two of said steel wheels, one on each side of said vehicle, being movable between lowered operative positions and raised inoperative positions, and two of said road wheels, one on each side of said vehicle, being movable between lowered operative positions and raised inoperative positions, one of said two movable rail wheels and one of said two movable road wheels on one side of said vehicle being mounted on first pivot arm means, and a second of said two movable rail wheels and a second of said two movable road wheels on the other side of said vehicle being mounted on second pivot arm means, first hydraulic cylinder means for actuating said first pivot arm means, second hydraulic cylinder means for actuating said second pivot arm means, said first and second hydraulic cylinder means being extended simultaneously for moving said first and second pivot arm means into first operative positions and being retracted simultaneously for moving said first and second pivot arm means into second operative positions, said first and second pivot arm means being mounted on common oscillating means, said oscillating means being pivotally movable about a generally longitudinal axis intermediate the two sides of said vehicle, and said first and second hydraulic cylinder means being mounted so that in both their extended and retracted positions they are approximately parallel to said longitudinal axis.

11. In a railcar moving vehicle as defined in claim 10 whee said first and second pivot arm means are mounted on the opposite ends of a common axle, and said common axle is mounted on a centrally located longitudinal pivot so said opposite ends are capable of oscillating up and down thereby permitting said movable steel and road wheels to oscillate to accommodate uneven rail and road conditions, said first and second hydraulic cylinder means being mounted so that in both their extended and retracted positions they are approximately parallel to said centrally located longitudinal pivot.

12. In a railcar moving vehicle as defined in claim 11 where said movable steel and road wheels are freewheeling, and the remaining two steel and two road wheels are driven from common drive means.

13. In a railcar moving vehicle having a coupler at one end for coupling with a railcar when driven on rail and for carrying a portion of the weight of the railcar thereon, and having means at the opposite end for carrying an extra load when driven on road, the improvement comprising, in combination, four steel wheels for supporting the vehicle on rail, four road wheels for supporting the vehicle on the ground, two of said steel wheels being located at the end of said vehicle having said coupler and said two steel wheels being driven when the vehicle is on rail, two of said road wheels being located at the opposite end of said vehicle and being driven when the vehicle is on ground, and a second pair of said steel wheels and a second pair of said road wheels being located intermediate the two pairs of driven steel and road wheels.

14. In a railcar moving vehicle as defined in claim 13 where said two driven steel wheels and said two driven road wheels are mounted on fixed axles, and said second pair of steel wheels and said second pair of road wheels are mounted on axles that move up and down between operative and inoperative positions.

* * * * *